United States Patent [19]
Bishop

[11] Patent Number: 5,477,714
[45] Date of Patent: Dec. 26, 1995

[54] KEY HOLDER WITH FLEXIBLE PLUNGER

[76] Inventor: Thomas J. Bishop, Ten Lamson Rd., Barrington, R.I. 02806

[21] Appl. No.: 312,306

[22] Filed: Sep. 26, 1994

[51] Int. Cl.⁶ ................................................. A47G 29/10
[52] U.S. Cl. .......................... 70/459; 24/3.6; 24/598.3; 24/600.7; 70/456 R; 206/37.5; 206/37.8
[58] Field of Search ........................ 70/456 R, 457, 70/459, 460; 24/3.6, 598.3, 600.7; D3/207, 212; 206/37.1, 37.5, 37.8

[56] References Cited

U.S. PATENT DOCUMENTS

| | | | |
|---|---|---|---|
| D. 310,447 | 9/1990 | MacDonald | D3/207 |
| 393,138 | 11/1888 | Blazier | 24/600.7 |
| 846,597 | 3/1907 | Morehouse | 24/598.3 |
| 1,293,543 | 2/1919 | Plank | 24/600.7 X |
| 2,111,493 | 3/1938 | Portner | 70/457 |
| 2,615,324 | 1/1952 | Meeker . | |
| 2,633,012 | 3/1953 | Johnstone | 70/459 |
| 4,592,219 | 6/1986 | Richter | 70/456 R |
| 4,776,191 | 10/1988 | MacDonald | 70/459 |
| 4,984,442 | 1/1991 | Benson | 70/456 R |
| 5,050,414 | 9/1991 | Hunag | 70/456 R |
| 5,174,139 | 12/1992 | Huang | 70/456 R |
| 5,209,089 | 5/1993 | Nelson | 70/456 R |
| 5,224,366 | 7/1993 | Huang | 70/456 R |

*Primary Examiner*—Lloyd A. Gall
*Attorney, Agent, or Firm*—Salter & Michaelson

[57] ABSTRACT

A key holder includes a keyring adapted to hold at least one preselected key, and a housing having an arcuate passage formed therein. The housing further has a notch formed in its outer periphery which is sized to receive the keyring and a first opening formed therein at one side of the notch which communicates with an end of the passage. A plunger having a flexible arm portion is disposed within the passage and movable between a position in which the flexible arm portion extends through the opening and across the notch for retaining the keyring to the housing and a position in which the flexible arm portion is withdrawn into the passage for allowing the removal of the keyring from the housing. The plunger is biased to its keyring retaining position, and the flexible arm portion is adapted to flex to conform to the shape of the passage when moving the plunger between its keyring-retaining and withdrawn positions.

10 Claims, 3 Drawing Sheets

KEY HOLDER WITH FLEXIBLE PLUNGER

BACKGROUND AND SUMMARY OF THE INVENTION

This invention relates generally to key holders, and more particularly to a key holder which releasably secures a preselected key or group of keys thereto in a manner which permits the key or group of keys to be quickly and easily detached from the main portion of the key holder when desired, and to a key holder which lends itself to many ornamental designs and shapes because of its simple, uncomplicated construction.

A wide variety of keyrings, key holders and key cases have been heretofore available for receiving and maintaining keys in assembled sets so that they are less likely to be lost or misplaced. However, it has been found that for various reasons it is often necessary or desirable to temporarily disassemble individual keys from key holders to prevent the use of the disassembled keys by strangers while at the same time permitting access to the remaining keys on the key holder. This has conventionally been done by having two seperate rings associated with the holder, one of which is releasably detachable from the holder. One set of keys, such as car keys, may be mounted on the detachable ring, while the user's other keys, such as house keys, etc. may be mounted on the other ring. Thus, while the user has to leave his car in a parking garage or lot, where the car keys have to be accessible to the operator of the garage or lot, the ring with the car keys can easily be detached from the holder and left in the car, whereby the holder with the owner's other personal keys such as house keys, may be retained by the owner so as not to be accessible to the parking attendant. One such key holder is disclosed in U.S. Pat. No. 4,984,442. A disadvantage associated with this key holder, however, is that the holder is limited to a square or rectangular shape due to the construction of its plunger element which securely retains the key to a body of the holder. Due to design constraints, it would be difficult to vary the shape and size of the key holder in accordance to customer demands (e.g., shaping the key holder to resemble a circular emblem or company logo).

Accordingly, among the several objects of the present invention are the provision of an improved key holder that while being able to readily and easily disassemble one or more keys from the key holder when desired, is also capable of being constructed in many shapes and sizes (e.g., squares, rectangles, circles, ellipses, etc.); the provision of such a key holder which permits one keyring to be disengaged therefrom with a simple manipulation which can be accomplished with one hand; and the provision of such a key holder which is simple in design and easy to manufacture.

In general, a key holder of the present invention comprises a keyring adapted to hold at least one preselected key, and a housing including an arcuate passage formed therein. The housing has a notch formed in its outer periphery which is sized to receive the keyring and a first opening formed therein at one side of the notch which communicates with an end of the passage. A plunger having a flexible arm portion is disposed within the passage and movable through an arcuate path between a position in which the flexible arm portion extends across the opening for retaining the keyring to the housing and a position in which the flexible arm portion is withdrawn into the passage for allowing the removal of the keyring from the housing. The plunger is biased to its keyring-retaining position, and the flexible arm portion is adapted to flex to conform to the shape of the passage when moving the plunger between its keyring retaining and withdrawn positions.

Other objects, features and advantages of the invention shall become apparent as the description thereof proceeds when considered in connection with the accompanying illustrative drawings.

BRIEF DESCRIPTION OF THE DRAWINGS:

In the drawings which illustrate the best mode presently contemplated for carrying out the present invention.

Corresponding reference numerals designate corresponding parts throughout the several views of the drawings.

Figure 1:
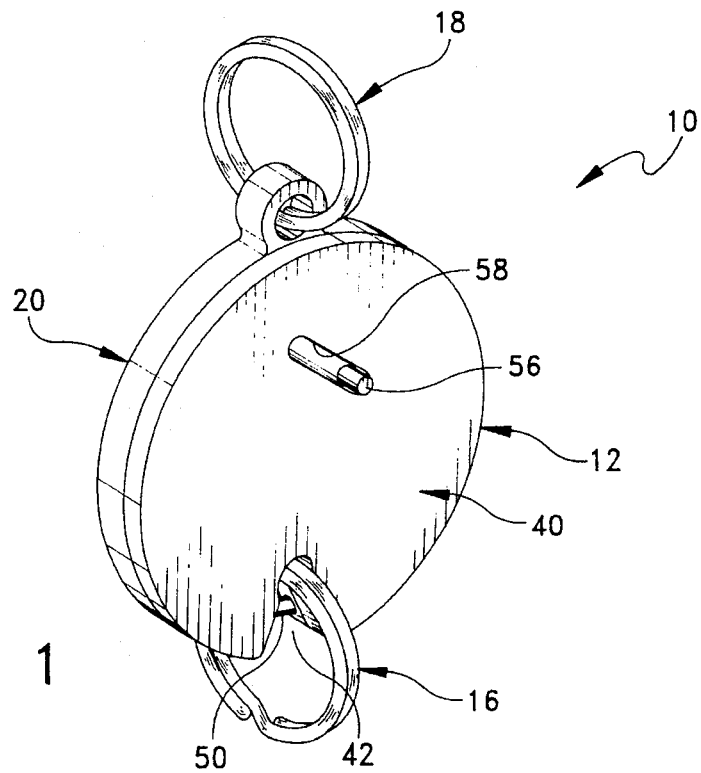
FIG. 1 is a front perspective view of a key holder of the present invention.

DETAILED DESCRIPTION OF THE PREFERRED EMBODIMENT:

Referring now to the drawings, and more particularly to FIGS. 1–4, there is generally indicated at 10 a key holder of the present invention illustrating a first preferred embodiment. The key holder 10 comprises a housing generally indicated at 12, a plunger generally indicated at 14, a first keyring, generally indicated at 16, which is releasably secured to the housing 12 by the plunger 14, and a second keyring, generally indicated at 18, which is permanently attached to the housing 12. The housing 12 may be fabricated from any rigid material, such as plastic or metal. The plunger 14 is moveable for permitting disengagment of the first keyring 16 from the housing 12 so that any keys assembled on the first keyring 16 can be removed from the housing 12. The second keyring 18 secures one or more additional keys to the housing 12.

Figure 2:
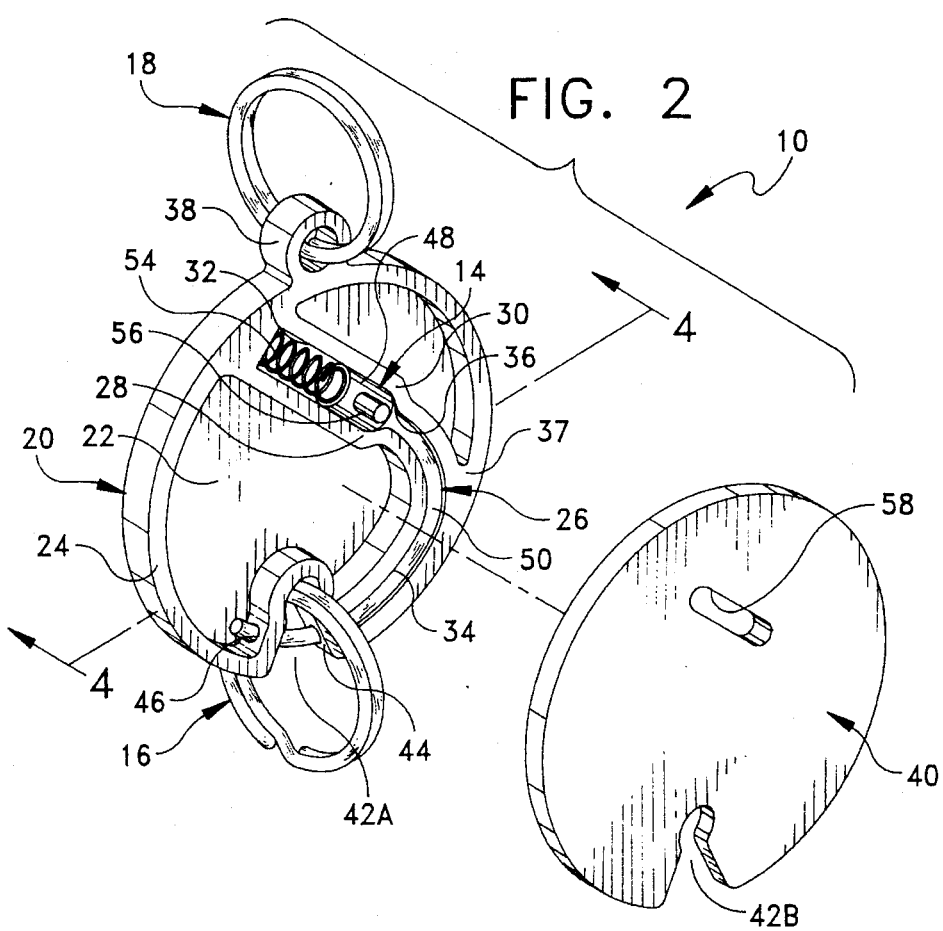
FIG. 2 is an exploded front perspective view of the key holder illustrating the plunger of the key holder in its a keyring retaining position.
Figure 3:
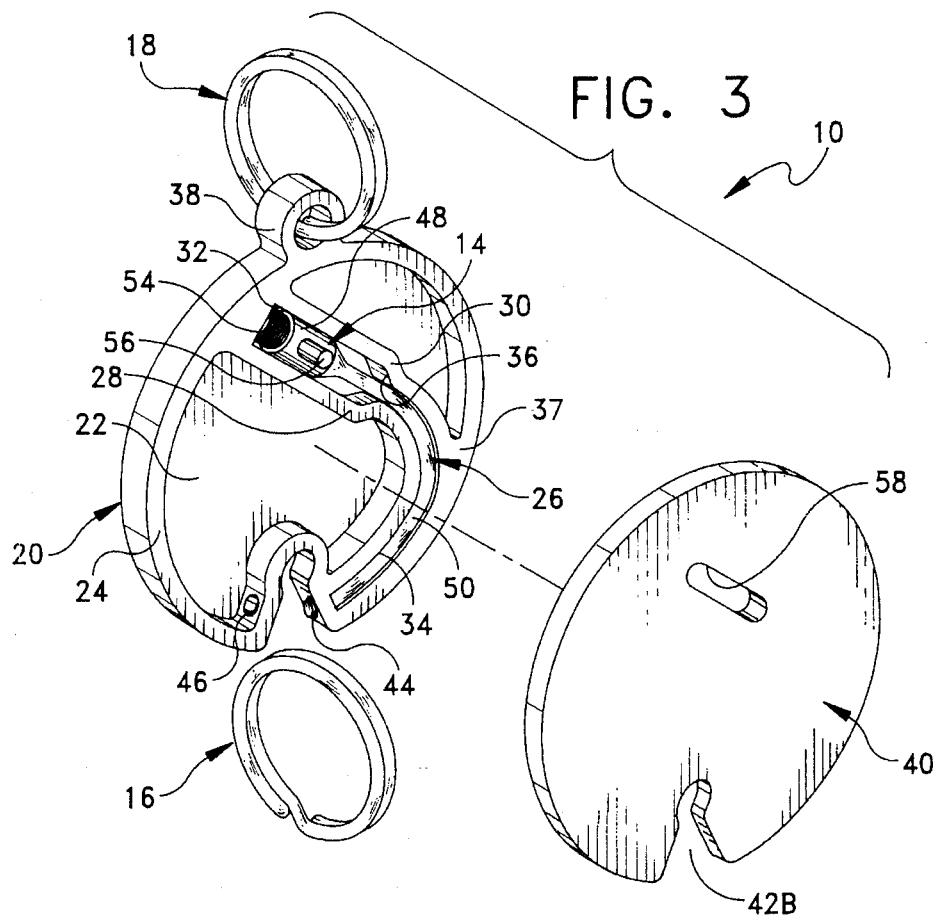
FIG. 3 is an exploded front perspective view similar to FIG. 2 illustrating the plunger in its withdrawn position.
Figure 4:
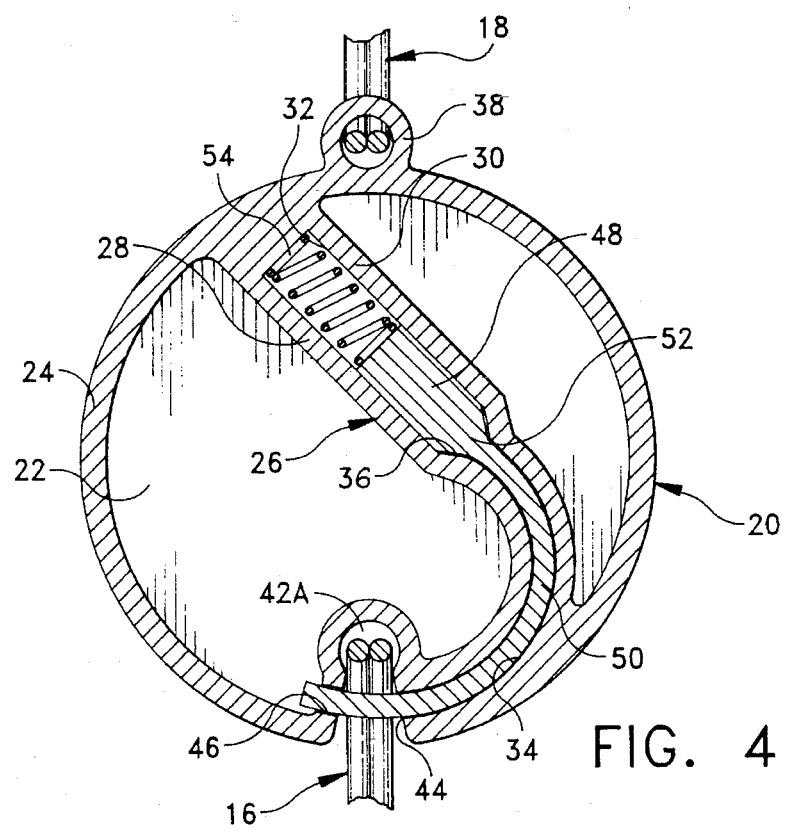
FIG. 4 is a cross-sectional view taken along line 4—4 of FIG. 2.

As best illustrated in FIGS. 2–4, the housing 12 comprises a body portion, generally indicated at 20, having a generally circular wall 22, an outer peripheral wall 24 extending perpendicularly from the circular wall 20, and a generally arcuate passage, generally indicated at 26, provided in the circular wall 22 and outer peripheral wall 24. As illustrated, the passage 26 is generally formed from two spaced apart walls 28, 30 which extend in the same direction as the outer peripheral wall 24 from the circular wall 22. The passage 26 has a linear, increased diameter section 32, an arcuate, reduced diameter section 34, and a tapered transitional section 36 provided between the increased diameter section 32 and the reduced diameter section 34. As shown, wall 30 merges into the outer peripheral wall 24 as at 37. At the top of the body portion 20 is an integral eye 38 member having an opening for receiving the second keyring 18 therein in a conventional manner.

The flexible plunger 14 is disposed in the passage 26 and retained therein by a cover generally indicated at 40, which encloses the passage 26. The cover 40 may be fixedly attached to the outer peripheral wall 24 by any suitable means, such as spot welding (for metal), adhesive, snap-fitting fasteners or the like.

The housing 12 further includes a notch 42 formed in its outer periphery which is sized to receive the first keyring 16. More particularly, the body portion 20 and cover 40 each have keyhole-shaped notches 42A, 42B, respectively, formed therein for receiving the first keyring 16. As illustrated, the outer peripheral wall 24 of the body portion 20 is keyhole-shaped at the notch 42A and is provided with a first opening 44 formed therein at one side of the notch 42A which communicates with the end of the reduced diameter section 34, and a second opening 46 formed therein at the opposite side of the notch 42A. As shown, the second opening 46 is in general alignment with the first opening 44.

The plunger 14 comprises a head portion 48 disposed in the increased diameter section 32 of the passage 26 and a flexible arm portion 50 disposed in the reduced diameter section 34 of the passage 26. The head portion 48 has a tapered end 52 which is sized to engage the transitional section 36 of the passage 26 for limiting the movement of the plunger 14 in the passage 26. As illustrated in FIGS. 2 and 3, the flexible arm portion 50 is movable between a position in which it extends across the notch 42 for retaining the first keyring 16 to the housing 12 within notch 42 and a position in which the flexible arm portion 50 is withdrawn into the reduced diameter section 34 of the passage 26 for allowing the removal of the first keyring 16 from the housing 12. As shown in FIGS. 2 and 4, the free end of the flexible arm portion 50 enters into and is received by the second opening 46 when the plunger 14 is moved to its keyring retaining position for ensuring that the keyring 16 is secured to the housing 12. Since the passage 26 at the reduced diameter section 34 is arcuate in shape, the arm portion 50 must be flexible to conform to the shape of the passage 26 when moving the plunger 14 between its keyring retaining and withdrawn positions. The arm portion 50 may be fabricated from any flexible plastic material or flexible wire.

The plunger 14 is biased to its keyring-retaining position by a spring 54 disposed within the increased diameter section 32 of the passage 26. As illustrated in FIG. 3, the first keyring 16 may be released from the housing 12 by moving the plunger 14 against the bias of the spring 54. In order to accomplish this movement, the head portion 48 of the plunger has an actuating member 56 which extends through a slot 58 formed in the cover 40 for moving the plunger 14 between its keyring-retaining and withdrawn positions. The slot 58 generally corresponds to the location of the increased diameter section 32 of the passage 26 when the cover 40 is attached to the body portion 20. Thus, by moving the actuating member 56 in the manner illustrated in FIG. 3, one or more keys retained by the first keyring 16 may be removed from the housing 12, since the flexible arm portion 50 is withdrawn into the reduced diameter portion 34 of the passage 26. This movement may be accomplished with a simple manipulation which can be done with one hand.

For use and operation of the key holder 10, a preselected key or group of keys is assembled on the first keyring 16 and one or more additional keys are assembled on the second keyring 18. During normal use, the keys assembled on the key holder 10 in this manner are effectively retained thereon so that they are not inadvertently disengaged from the holder 10. However, if desirable, the preselected key or group of keys assembled on the first keyring 16 can be quickly and easily removed from the housing 12 and the keys on the second keyring 18. Specifically, by moving the actuating member 56 against the bias of spring 54, the flexible arm portion 50 of the plunger 14 moves from its keyring retaining position to its withdrawn position in which the arm portion 50 is withdrawn into the reduced diameter section 34 of passage 26 and the first keyring 16 can then be removed from the housing 12. Thereafter, the first keyring 16 and any keys thereon can be easily and quickly reassembled with the housing 12 by moving the plunger 14 to its withdrawn position, placing the first keyring 16 within the notch 42, and releasing the actuating member 56 so that spring 54 moves the flexible arm through the first opening 44, into the keyring 16, and through the second opening 46. It will be understood that the keyrings 16 and 18 may be conventional split-rings so that individual keys may be attached and detached with respect to each ring in a well known manner although other forms of rings that permit attachment and detachment of the keys may be used.

Figure 5:
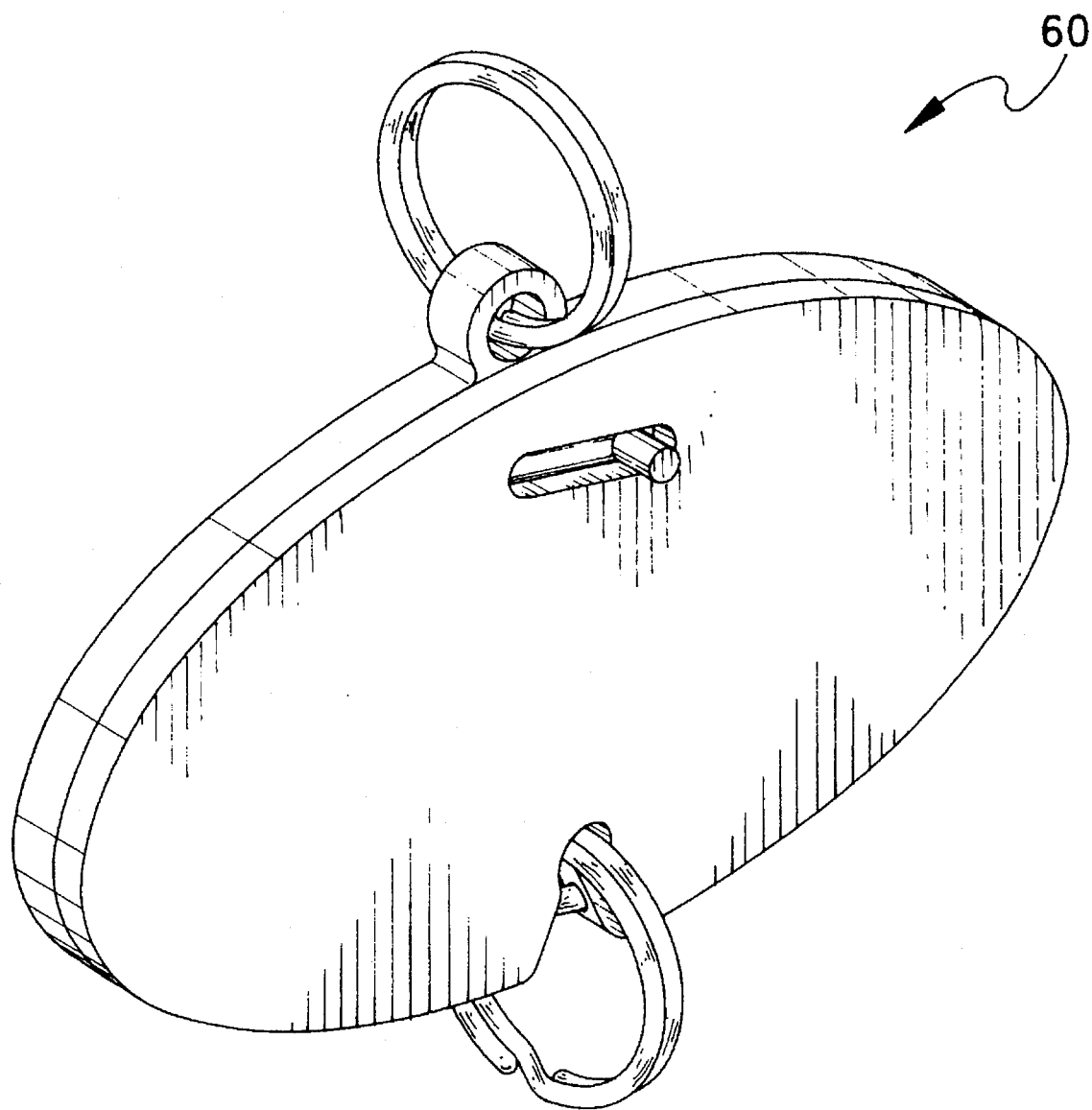
FIG. 5 is a front perspective view of a key holder of an alternate design.

FIG. 5 illustrates a second preferred embodiment of a key holder 60 of nearly identical construction to key holder 10 except for its shape. As illustrated, the second key holder 60 is elliptical-shaped, whereas the first key holder 10 is circular-shaped. It should be noted that the provision of the flexible arm portion allows the key holder to assume many shapes and sizes (e.g., squares, rectangles, circles, ellipses, etc.). Thus, unlike prior key holders, it is easy to vary the shape and size of the key holder in accordance to customer demands (e.g., shaping the key holder to resemble an emblem or company logo).

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A key holder comprising:

a keyring adapted to hold at least one preselected key;

a housing including an arcuate passage formed therein, said housing having a notch formed in its outer periphery which is sized to receive the keyring, and a first opening formed therein at one side of the notch which communicates with an end of the passage;

a plunger having a flexible arm portion, said plunger being disposed within the passage and movable between a position in which the flexible arm portion extends through the opening and across the notch for retaining the keyring to the housing, and a position in which the flexible arm portion is withdrawn into the passage for allowing the removal of the keyring from the housing, said plunger being axially flexing along its longitudinal axis biased to its keyring retaining position, said flexible arm portion flexing to conform to the shape of the arcuate passage when sliding the plunger between its keyring-retaining and withdrawn positions.

2. The key holder as set forth in claim 1, said housing comprising a body portion having said passage formed therein and a cover for enclosing the body portion.

3. The key holder as set forth in claim 2, said passage having an increased diameter section and a reduced diameter section, said plunger having a head portion disposed in the increased diameter section of the passage, said arm portion being disposed in the reduced diameter section of the passage.

4. The key holder as set forth in claim 3, said cover having a slot formed therein which corresponds to the increased diameter section of the passage for accessing the passage, said head portion of the plunger having an actuating member which extends through said slot for moving the plunger between its keyring retaining and withdrawn positions.

5. The key holder as set forth in claim 4, said plunger being biased to its keyring-retaining position by a spring disposed within the increased diameter section of the passage, wherein the keyring is released from the housing by moving the actuating member against the bias of the spring.

6. The key holder as set forth in claim 5, said passage further having a tapered transitional section between the increased diameter section and the reduced diameter section, and said head portion having a tapered end which engages the transitional section for limiting the movement of the plunger in the passage.

7. The key holder as set forth in claim 1, said housing having a second opening formed therein at an opposite side of the notch, said second opening being in general alignment with the first opening, said second opening being adapted to receive an end portion of the flexible arm portion therethrough when the plunger is moved to its keyring retaining position.

8. The key holder as set forth in claim 1, said flexible arm portion being fabricated from plastic material.

9. The key holder as set forth in claim 1, said flexible arm portion being fabricated from wire.

10. The key holder as set forth in claim 1, said housing having a peripheral eye member substantially oppositely disposed from said notch, and a second keyring extending through said eye member.

* * * * *